United States Patent
Sawada et al.

[15] 3,662,541
[45] May 16, 1972

[54] ENGINE EXHAUST GAS OXIDIZING SYSTEM

[72] Inventors: Hiraki Sawada, No. 2068-112, 3 chome, Tujimi-cho, Higashi-muayama, Tokyo; Kenji Masaki, No. 640, 4-chome, Seki-machi, Nerima-ku, Tokyo, both of Japan.

[22] Filed: Mar. 15, 1971

[21] Appl. No.: 124,466

Related U.S. Application Data

[63] Continuation of Ser. No. 823,553, May 12, 1969, abandoned.

[30] Foreign Application Priority Data

July 10, 1968     Japan..................................43/48243

[52] U.S. Cl..................................60/30 R, 23/2 C, 23/277 C
[51] Int. Cl.................................F02b 75/10, F01n 3/10
[58] Field of Search....................60/30 R; 23/2 C, 277 C

[56] References Cited

UNITED STATES PATENTS

| | | | |
|---|---|---|---|
| 1,114,034 | 10/1914 | Prescott | 60/30 |
| 2,390,527 | 12/1945 | Flint | 60/30 |
| 3,237,399 | 3/1966 | Hamblin | 60/30 |
| 3,302,394 | 2/1967 | Pahnke | 60/30 |
| 3,335,564 | 8/1967 | Hines | 60/30 |
| 3,390,520 | 7/1968 | Mattson | 60/30 |
| 3,438,198 | 4/1969 | Bentele | 60/30 |
| 3,486,326 | 12/1969 | Hermes | 60/30 |

FOREIGN PATENTS OR APPLICATIONS

| | | | |
|---|---|---|---|
| 933,943 | 8/1963 | Great Britain | 60/30 |

*Primary Examiner*—Douglas Hart
*Attorney*—Robert E. Burns and Emmanuel Lobato

[57] ABSTRACT

A system for converting the unburned or partially burned toxic compounds of the exhaust emission from an automotive gasoline-powered engine into harmless gases through re-oxidization of the emission in the exhaust system. An appropriate amount of fresh air is delivered to the exhaust system in close response to the pulsation of the exhaust pressure so that the mixture of the exhaust emission and air is after-burned satisfactorily under the varying conditions of the engine operation.

9 Claims, 14 Drawing Figures

ENGINE EXHAUST GAS OXIDIZING SYSTEM

This is a continuation of Ser. No. 823,553, filed May 12, 1969, now abandoned.

The present invention relates to improvements in the exhaust system of an automotive gasoline-powered engine and, more particularly, to systems for converting the engine exhaust gases containing toxic compounds into harmless ones before the exhaust gases are released out of the exhaust system.

The term "exhaust system" as herein used is intended to include the exhaust valve, exhaust port, exhaust manifold (in multi-cylinder engines), exhaust pipe, muffler, tail pipe, and other associated parts, as is customary in the art.

Conversion of the unburned or partially burned toxic compounds of the exhaust gases from an automotive engine into harmless compounds is a requisite for preventing the air pollution in the urban areas today and, for this purpose, it is an ordinary practice to have the combustible component of the exhaust gases burned in the exhaust system before it escapes into the air.

In order that the unburned content of the engine exhaust gases be burned or oxidized while it stays in the exhaust system, as is well known, it is necessary to supply additional air to the exhaust system for satisfactory re-combustion of the unburned content. There are two general types of system for introducing atmospheric air into the exhaust system of an automotive engine — one using a pneumatic pump and the other using an air ejector.

The use of a pneumatic pump, which requires the provision of an extra drive mechanism and is complex in its construction and is space-taking in itself, inevitably involves skillful and meticulous installation work and increased production cost. If, on the other hand, an air ejector is to be employed, it is essential to reduce the diameter of the exhaust pipe to a reasonable extent for the purpose of supplying an adequate amount of air to the exhaust system, which again is reflected by degraded performance quality of the engine, as is well known. Introduction of atmospheric air into the exhaust system by means of an air ejector will, moreover, lead to increased noises at the air inlet and if it is desired to quiet or "silence" such noises the ejector, in turn, will not function satisfactorily because of the increased resistance to the air flow. In the existing engine exhaust systems designed and used for the re-combustion of the combustible component of exhaust emission, furthermore, special control devices must be incorporated in the exhaust system for relieving or bypassing the air to be admixed to the exhaust gases in accordance with the driving conditions of the engine. This is partly because the exhaust system undergoes the influence of the heat that has evolved therein and partly because the pressure in the exhaust system rises to impair the performance quality of the engine, under the high-speed, high-load operation of the automobile.

To overcome these and other drawbacks thus far inherent in the prior art re-combustion systems for engine exhaust gases, the present invention contemplates to provide improved systems of the character which is adapted to have the unburned content of the engine exhaust gases burned before it is released out of the exhaust system.

Figure 1:
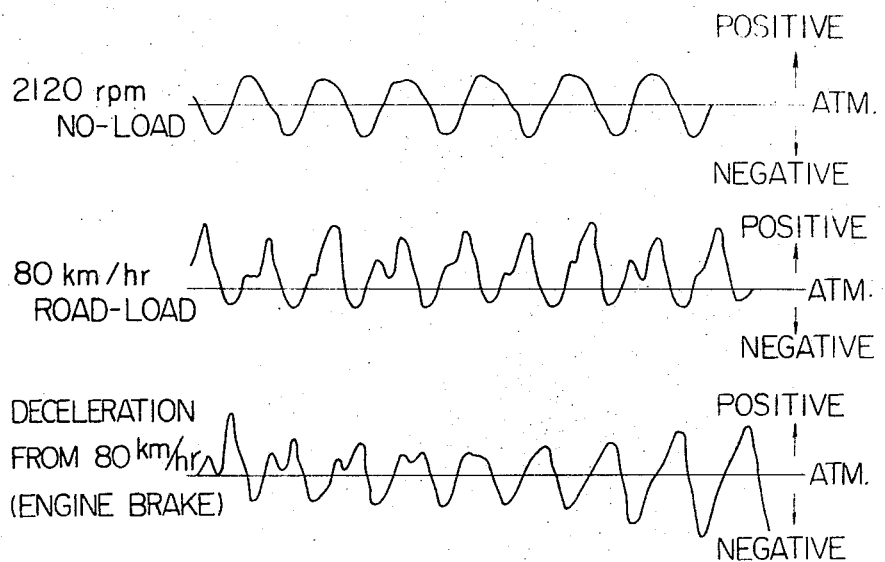
FIG. 1 is typical oscillographic representations of the pulsating pressure in the exhaust system under different modes of the automobile operation.

As illustrated in FIG. 1, the pressure in the exhaust system varies in a pulsating fashion according to the construction of the engine, driving conditions and construction of the exhaust system as the consequence of the periodical motion of the reciprocating or rotary engine, exhibiting positive and negative pressures alternately.

This implies that is a vent communicating with the atmosphere is provided at a suitable position in the exhaust system, the engine exhaust gases will be allowed out of the exhaust system with the exhaust pressure at positive whilst atmospheric air will be admitted to the interior of the exhaust system with the exhaust pressure at negative. Thus, it will be possible to introduce atmospheric air only when the exhaust pressure is at a negative level without allowing the exhaust gases to escape into the air when the exhaust pressure is positive, if there is provided in the vent a suitable control device such that is adapted to close and open the vent with the exhaust pressure at positive and negative, respectively.

Figure 2:
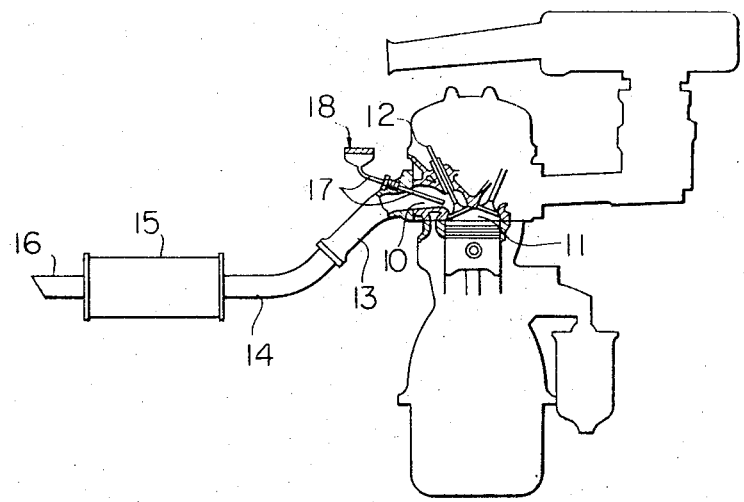
FIG. 2 is a view showing, in vertical section, the general arrangements of re-combustion system according to the invention.

Such concept is realized in a simplified form in the re-combustion system according to the present invention. Referring to FIG. 2 which shows the re-combustion system used on a reciprocating engine, the exhaust system comprises an exhaust port 10 leading from the combustion chamber 11 of the engine, exhaust valve 12 adapted to discharge a fluid stream of exhaust gases out of the exhaust port 10, exhaust manifold 13 connected with the exhaust port, exhaust pipe 14 connected with the exhaust manifold 13, the muffler 15 connected with the exhaust pipe and adapted to absorb the exhaust noises, and tail pipe 16 connected with the muffler 15 and opened to the air.

According to the present invention, there are further provided in the exhaust system an air inlet pipe or passageway 17 and an air control valve 18 mounted in the inlet pipe. The air control valve 18 is, as will be described in more detail, so constructed as to open and close the inlet pipe 17 while the exhaust pressure is at negative and positive, respectively. With the valve 18 held in a position to open the inlet pipe 17, atmospheric air or oxidizing agent is introduced by way of the valve 18 into the exhaust port 10 immediately downstream of the exhaust valve 12. The air introduced into the exhaust port 10 mixes with the hot exhaust gases delivered from the combustion chamber 11 with the exhaust valve 12 opened in the subsequent cycle of the engine operation. The mixture of the exhaust gases and atmospheric air is passed down to the muffler 15, during which time the incompletely oxidized combustible compounds (i.e. the carbon monoxides and hydrocarbons) contained in the mixture are oxidized into harmless carbon dioxides and water vapour until they are discharged out of the tail pipe 16 into the atmosphere.

In order to urge the mixture to be burned quickly and completely while it stays in the exhaust system, it will be advantageous to have the mixture entrained evenly and sufficiently with the air, maintain the resultant mixture at an appropriately high temperature, and permit the mixture to stay in the exhaust system as long as possible, as is well known.

Figure 3:
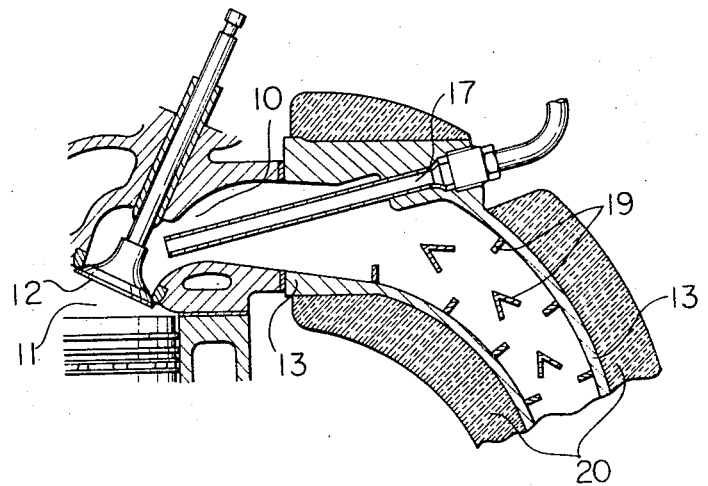
FIGS. 3 to 5 are views showing, all in vertical section on an enlarged scale, the embodiments of the system shown in FIG. 2.

To accomplish these ends, a plurality of baffle means 19 and heat insulators 20 are provided past the exhaust port 10, as shown in FIG. 3. The baffle means 19 will serve to blend the mixture satisfactorily by creating a turbulent flow while it stays in the exhaust manifold 13 while the insulators 20 will serve to minimize the amount of heat to be lost to the outside. If the diameter of the exhaust manifold is increased to increase the internal volume thereof, the mixture will stay the longer in the exhaust manifold 13.

Figure 4:
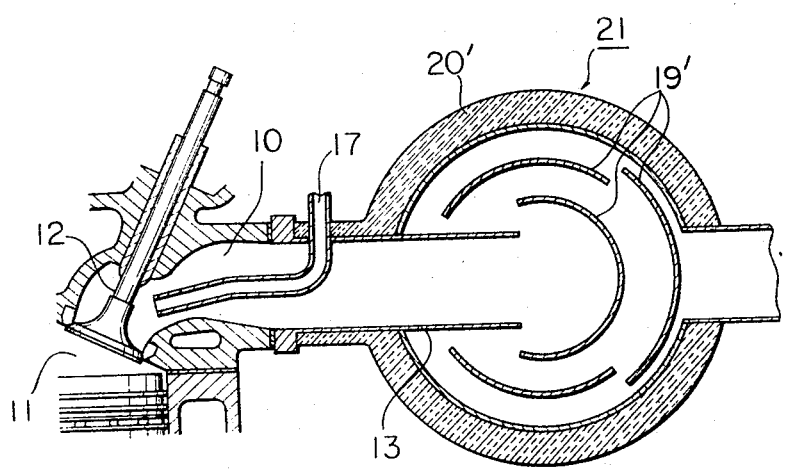

An alternative example of the system shown in FIG. 3 is illustrated in FIG. 4, wherein an oxidizing reactor 21 is provided past the exhaust port 10. The reactor 21 has provided therein a plurality of baffle means 19' and heat insulators 20', both functioning in a similar manner to the counterparts in FIG. 3.

Figure 5:
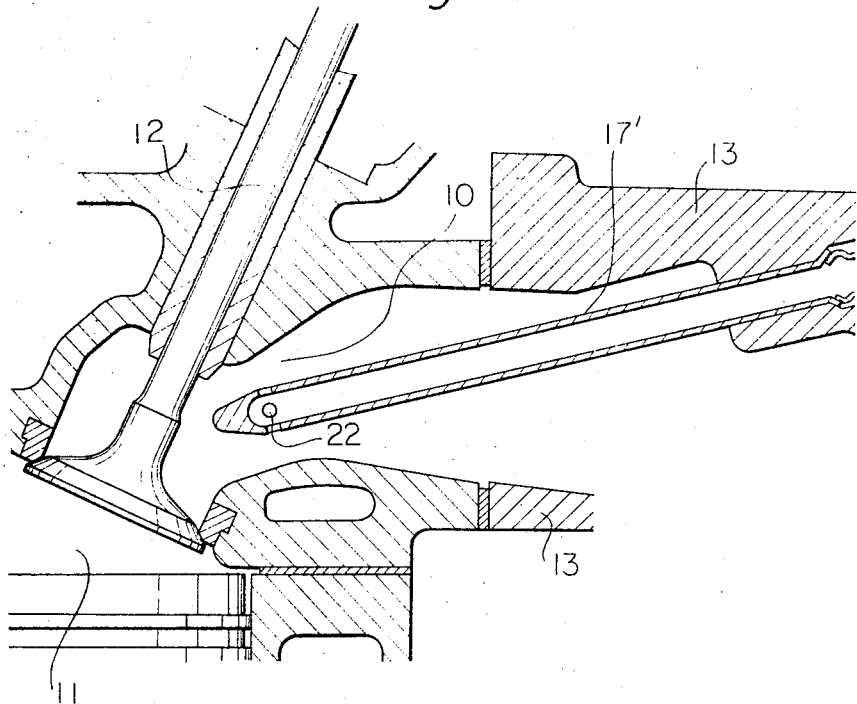

By preference, the air inlet pipe 17' may be closed at its tip and provided with a vent 22 which is so located and shaped as to receive the static pressure of the exhaust gases, as shown in FIG. 5. The pipe 17' thus arranged will afford an effect that is attainable where an air ejector is utilized, thereby adding to the amount of air to be mixed with to the exhaust gases.

Figure 6:
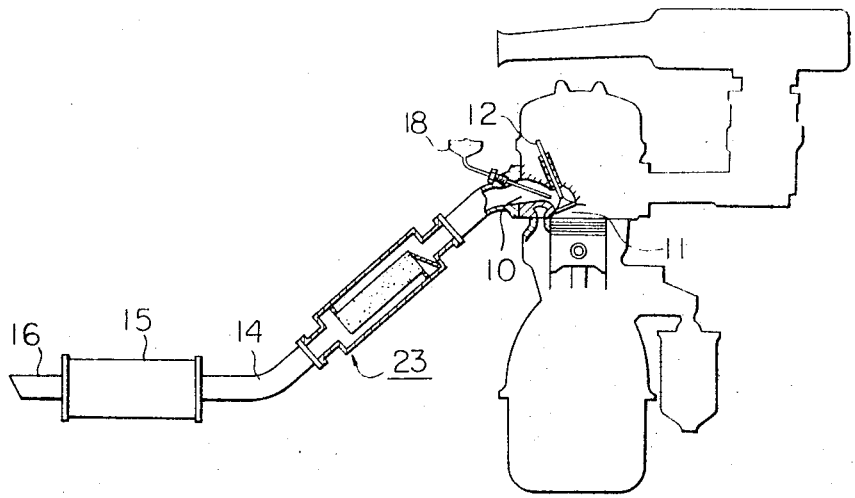
FIG. 6 is similar to FIG. 2 but shows another embodiment thereof.

For the purpose of accelerating the oxidization of the mixture of the exhaust gases and air in the exhaust system, a chemical oxidizing catalyzer 23 may be provided at a suitable position of the system, as seen from FIG. 6.

Figure 7:
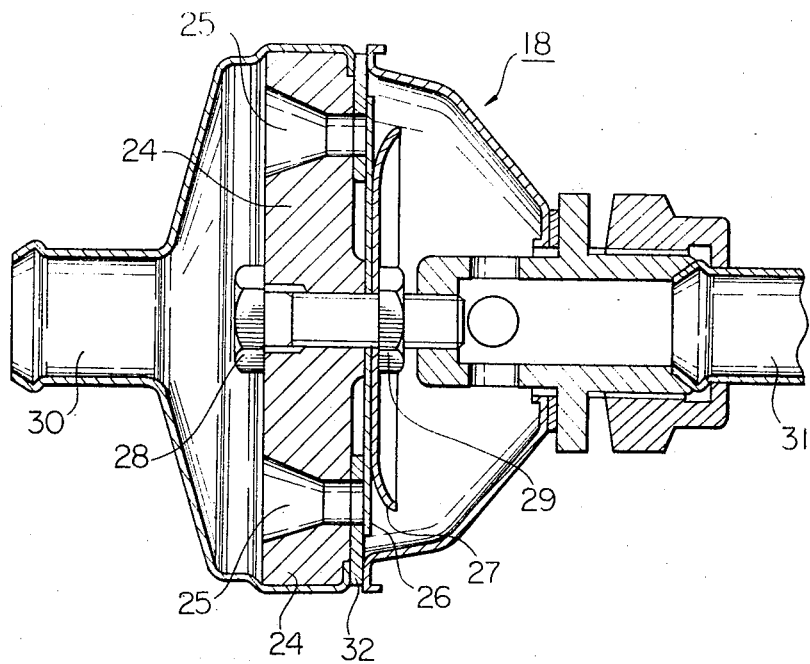
FIG. 7 is a view showing, in vertical section, an example of the check valve used in the re-combustion systems of the invention.

FIG. 7 illustrates an example of the pressure-responsive valve 18 to be mounted in the air inlet pipe 17 for controlling the flow of air into the exhaust port 10 in response to the pulsation in the pressure in the exhaust system. As shown, the valve 28 is constructed as a check valve acting to close and open the inlet pipe 17 while the exhaust pressure is at a positive and a negative level, respectively. The check valve 18 includes a valve seat or plate structure 24 having provided therein at least one opening 25 of suitable shape, a valve plate or member 26 superposed on the valve seat structure 24 and normally closing the opening 25, a retainer means 27 superposed on the valve plate 26, and fastening means or a bolt 28 and nut 29 securing in place the valve seat structure 24, valve plate 26 and the retainer means 27 together. The valve assembly 18 communicates with both the atmosphere through the passage 30 and the exhaust system through the passage 31 of the inlet pipe.

The valve plate 26 may be made of any material of pliable type.

While a positive pressure is exerted on the valve plate 26 from the exhaust system by way of the passage 31, the valve plate 26 is forced against the valve seat structure 24 securely so that the exhaust gases existing in the exhaust system are prohibited to pass through the check valve from the passage 31 to passage 30. Whereas, when a negative pressure is present at the passage 31, the valve plate 26 is pulled over toward the passage 31 and becomes warped away from the valve seat structure 24, thereby allowing the atmospheric air from the passage 30 to passage 31. The retainer means 27 serves to restrict the valve plate 26 to be excessively warped toward the passage 31 so as to protect the valve plate 26 from application thereto of excess stress resulting from the warpage. If desired, a sheet of elastic material such as rubber may be attached to the valve seat structure 24 over the entire or partial area thereof as designated at 32 in the figure so that the valve plate 26 may not hit on the valve seat too strongly. Unless, however, such an elastic sheet 32 is used, the valve plate 26 may be made of an elastic material.

Although the valve 18 has been described and shown to be a check valve, it may be constructed and arranged in many other ways as far as it functions to allow atmospheric air into the exhaust system while the exhaust pressure is at negative and to prohibit the exhaust gases from escaping into the air while the pressure is at positive.

Where, now, the re-combustion system as hereinbefore described is to be used in combination with a multicylinder engine type, either a single valve may be used for all of the cylinders or a plurality of valves may be mounted on each or each group of the cylinders, as the case may be.

Figure 8:
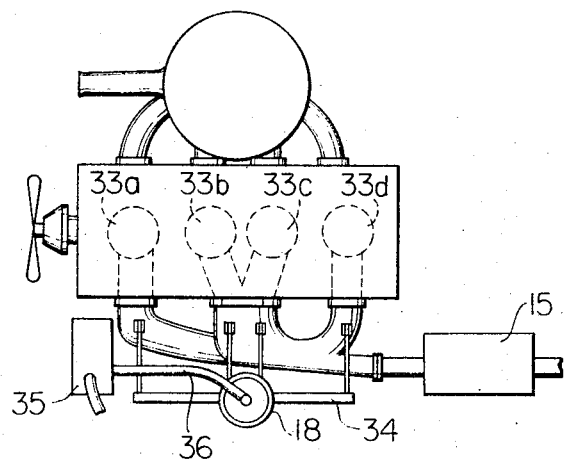
FIG. 8 is a view showing schematically the general configuration of the exhaust system used on a four-cylinder engine and having a single check valve which is mounted separately of the re-combustion air cleaner.
Figure 9:
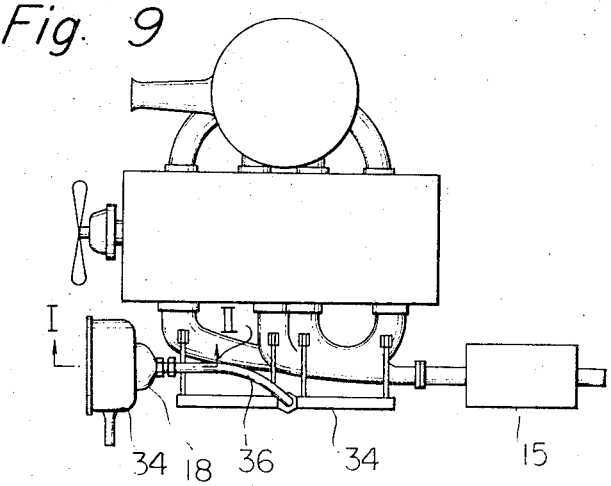
FIG. 9 is similar to FIG. 8 but showing the system using a single check valve which is mounted integrally with the re-combustion air cleaner.
Figure 10:
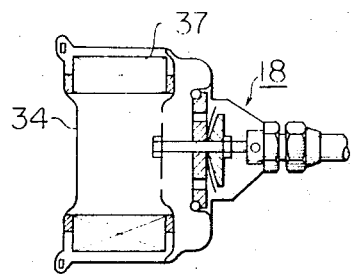
FIG. 10 is the section on line 1—1 of FIG. 9.

A practical example of the valve arrangement used on a four-cylinder engine is shown in FIG. 8. As shown, air sucked in through a single valve 18 is delivered to each of the cylinders 33a, 33b, 33c and 33d by way of the air gallery 34. If desired, a silencer 35 of known construction may be connected with the valve 18 through a conduit 36. In this instance, the silencer 35 may be connected integrally with the valve 18 for simplicity of construction, as illustrated in FIG. 9. In order to protect the valve from ingress of dusts prevailing therearound, it may prove advantageous to provide a filter element 37 in the silencer 35 so that the dust particles in the air sucked in is trapped thereby, as shown in FIG. 10.

Figure 12:
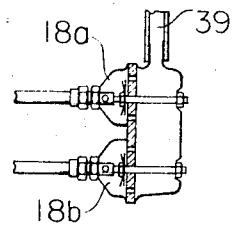
FIG. 12 is a view showing, on an enlarged scale, the check valves used in the system shown in FIG. 11.
Figure 11:
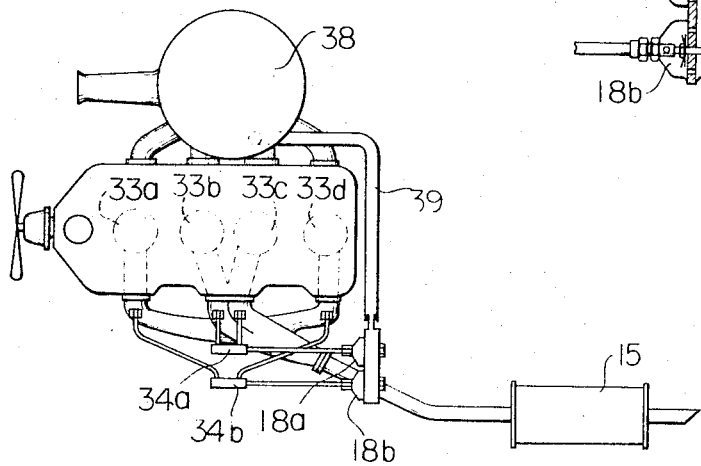
FIG. 11 is a view similar to FIGS. 8 and 9, but in which are used two check valves.

FIG. 11 shows another practical example of the valve arrangement for use in a four-cylinder engine, wherein two valves are used for independently controlling the air to be supplied to two pairs of cylinders. As shown, the valve 18a is linked with the pair of the cylinders 33b and 33c by way of the air gallery 34a and the valve 18b with the pair of the cylinders 33a and 34d by way of the gallery 34b. For eliminating the exhaust noises and for preventing the ingress of dusts into the exhaust system, the valves 18a and 18b may be so arranged as to communicate with the clean side of the engine air cleaner 38 by way of the air suction conduit 39, as illustrated on an enlarged scale in FIG. 12.

Figure 13:
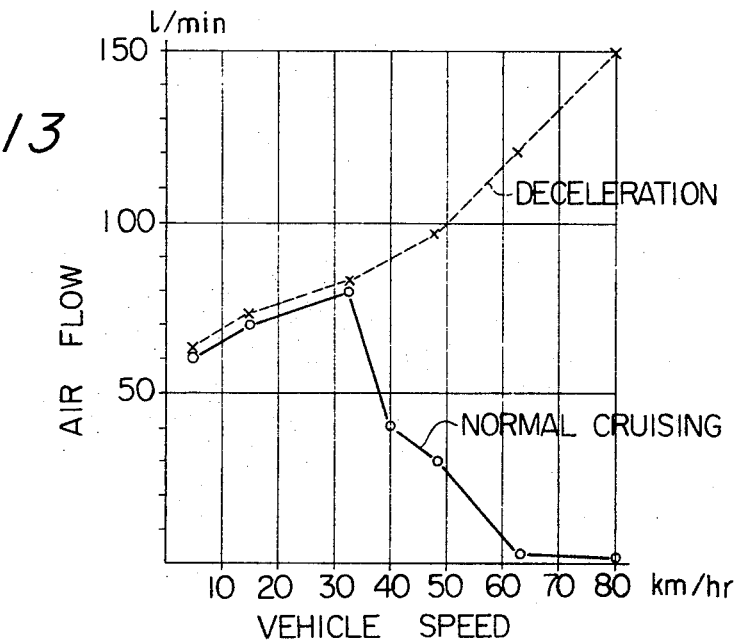
FIG. 13 is a graph illustrating a typical example of the relationship between the amount of suction air and the automobile speed.

FIG. 13 indicates an example of the variation in the amount of air to be drawn into the exhaust system in terms of the speed of the automobile under the normal cruising and coasting operation through the air inlet pipe 17 which forms essential part of the system of the invention.

It is observed from the illustration of FIG. 1 that, in the normal cruising operation of the automobile, the flow rate of air through the check valve becomes decreased as the automobile speed exceeds a certain level, say at about 30km/hr as seen from the graph, until it becomes substantially zero as the automobile runs at a speed in excess of a certain point, say, about 65km/hr as seen from the graph of FIG. 11. This is because the vacuum at the exhaust system becomes damped off as the amount of the exhaust gases grows larger in accordance as the automobile speeds up at a speed exceeding the said point.

It is well known that there is contained in the exhaust gases a larger amount of combustible component during the low speed operation of the automobile than during the high speed cruising operation and that there is no need of supplying air to the exhaust system during the cruising operation. Introduction of atmospheric air into the exhaust system during the high speed operation will therefore result in an objectionable overheat and increase of the pressure in the exhaust system, leading to the degraded engine performance and the lessened durability of the engine and exhaust systems. This is just the reason why it is required to shut off the flow of atmospheric air into the exhaust system during the high speed operation of the automobile.

In the re-combustion system using a pneumatic pump, as heretofore constructed, the air that has once been introduced into the exhaust system by means of the pneumatic pump is let to escape therefrom by means of a relief valve during the high speed operation of the automobile, thereby preventing an undue increase in both the heat and pressure in the exhaust system.

According to the present invention, it is to be noted, such an unwanted increase in the temperature and pressure in the exhaust system can be avoided with use of no extra and costly devices such as a relief valve, because the flow of air to the exhaust system is regulated by means of a simply constructed check valve working in close response to the change in the pressure levels at the exhaust system.

FIG. 13 also reveals that a larger amount of air is supplied to the exhaust system during the coasting operation at a higher automobile speed because a high vacuum prevails in the system during that operation. Since, moreover, a larger amount of hydrocarbons and carbon monoxides are emitted during the coasting operation at a relatively high speed, as a matter of fact, it is required to supply the exhaust system with a larger amount of fresh air. Such a requirement is advantageously met with by the system of the invention as observed from the curve of FIG. 13.

Figure 14:
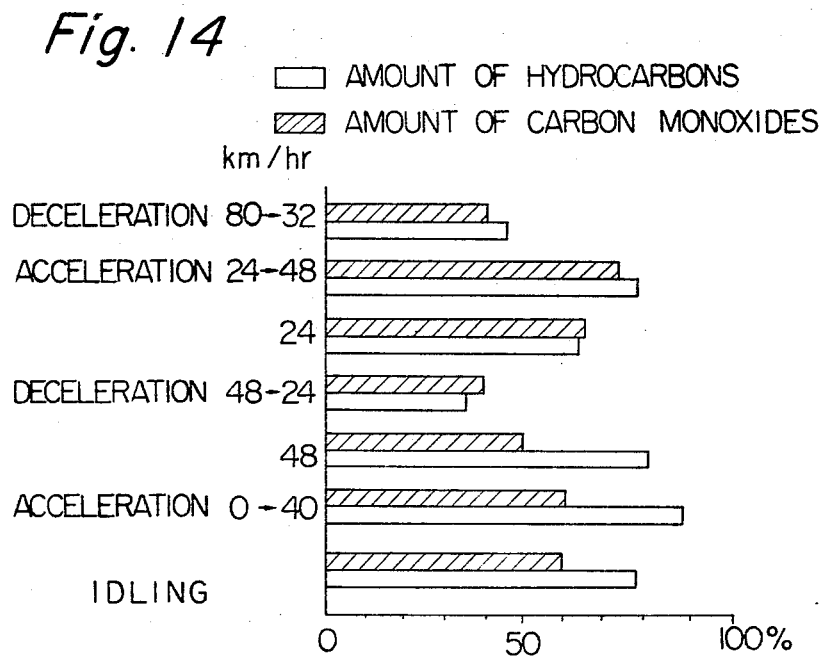
FIG. 14 is a graph showing an example of the results of the experiments conducted to evaluate the effectiveness of the re-combustion systems according to the present invention.

It will now be appreciated from the foregoing description that the system according to the invention is useful for the satisfactory re-combustion of the combustible component of the exhaust gases through introduction of fresh air into the exhaust system under the control of one or more valves. The effectiveness of such recombustion will be ascertained from the graphic representation of FIG. 14.

Experiments were conducted to find out the extent of the reduction in the amounts of the hydrocarbons and carbon monoxides that were contained in the total exhaust gases under the different modes of the automobile operation, i.e., the idling, coasting from 0 to 40km/hr, normal cruising at 48km/hr, coasting from 48 to 24km/hr, normal cruising at 24km/hr, acceleration from 24 to 48km/hr, and coasting from 80 to 32km/hr, the extent being indicated in percentage as compared with the said compounds to be emitted if the flow of the fresh air is assumed to be totally shut off with the check valve fully closed.

Thus, the re-combustion system of the invention is useful to have the combustible compounds burned efficiently while they stay in the exhaust system with higher performance quality and at lower production cost than the conventional re-combustion system.

It should also be noted that the re-combustion system of the present invention is specially suited for use with engines of relatively small piston displacement, in view of its minimized production cost and the freedom from the loss in the driving power resulting from the increase in the pressure at the exhaust system as is experienced in the conventional systems using a pneumatic pump.

We claim:

1. In an exhaust system of an automotive internal combustion engine having means defining an exhaust port located immediately downstream of an exhaust valve and an exhaust manifold communicating with said exhaust port, a system for oxidizing engine exhaust gases discharged into said exhaust port comprising: an air inlet pipe in communication with the atmosphere and opening into said exhaust port to directly sense pressure pulsations of the exhaust gases in said exhaust port; said inlet pipe extending generally in a direction opposite to the flow of exhaust gases and having an opening to deliver a flow of air into said exhaust gases adjacent said exhaust port and a one-way valve mounted on said air inlet pipe responsive to the pressure pulsations of the exhaust gases in said exhaust port sensed by said air inlet pipe to effect periodic closing of said air inlet pipe when positive pressures exist in said exhaust port and periodically opening said air inlet pipe to allow flow of air to said exhaust port only when negative pressures obtain as a function of the existence and duration of said negative pressures in said exhaust port thereby introducing atmospheric air into said exhaust port only when said negative pressures obtain and in a direction other than the direction of flow of the exhaust gases.

2. A system according to claim 1, further comprising a plurality of baffle means mounted on said exhaust manifold; and heat insulators surrounding the exhaust manifold.

3. A system according to claim 1, further comprising an oxidizing reactor mounted on said exhaust manifold; a plurality of baffle means mounted within said oxidizing reactor; and a heat insulator surrounding said oxidizing reactor.

4. A system according to claim 1, further comprising a chemical catalizer mounted in said exhaust system within the flow path of the exhaust gases.

5. An apparatus for effecting further oxidation exhaust products of combustion in an exhaust system comprising: means defining an exhaust system having an inlet receptive during use of the apparatus of a stream of exhaust gases having products of combustion therein incompletely oxidized and being under fluctuating, alternating positive and negative pressures and an outlet for discharging said stream of exhaust gases from said exhaust system; pipe means defining a passageway in communication with said exhaust system immediately downstream of said inlet and periodically connected during operation of the apparatus to the atmosphere; said pipe means having an opening at an innermost end thereof and extending in a direction for flowing atmospheric air into said exhaust gases in a direction substantially counter to the flow of said exhaust gases, said innermost end of said pipe means being close adjacent to said exhaust inlet, and pressure-responsive valve means for periodically admitting a flow of air through said passageway into said exhaust system in direct response to negative pressure conditions of the stream of exhaust gases and only during the existence of said negative pressure conditions and periodically preventing admission of the atmospheric air into said exhaust system in direct response to positive pressure conditions of the stream of exhaust gases and only during the existence of said positive pressure conditions.

6. An apparatus according to claim 5; wherein said pressure-responsive valve means comprises a valve seat positioned across said passageway in fluidtight relationship, means defining at least one opening in said valve seat, a movable mounted pressure-responsive valve member movable to a first position effective to close said opening in response to negative pressure conditions of the fluid stream and movable to a second position effective to open said opening in response to positive pressure conditions of the fluid stream of exhaust gases, and means mounting said pressure-responsive valve member for movement to said first and second positions.

7. An apparatus according to claim 6, including means disposed in said exhaust passageway for effecting turbulent flow of the stream of exhaust gases to effectively mix together the stream of exhaust gases and the atmospheric air.

8. An apparatus according to claim 7; wherein said last-mentioned means comprises a plurality of baffles connected in staggered relationship within said exhaust system.

9. A method of further oxidizing incompletely oxidized exhaust products of combustion flowing from a combustion chamber under fluctuating, alternating positive and negative pressure conditions comprising: flowing a stream of exhaust gases of combustion containing therein incompletely oxidized products under fluctuating positive and negative pressures from a combustion chamber to an oxidizing zone; and automatically periodically admitting a flow of oxidizing air into said stream delivered thereto in a direction of flow substantially a counter flow and discharging said flow of air into said stream of exhaust gases immediately downstream of said combustion chamber under direct control of and only in direct response to negative pressure conditions of said stream of exhaust products of combustion to effect further oxidation of said incompletely oxidized products in said oxidizing zone.

* * * * *

UNITED STATES PATENT OFFICE
CERTIFICATE OF CORRECTION

Patent No. 3,662,541         Dated  May 16, 1972

Inventor(s) HIRAKI SAWADA and KENJI MASAKI

It is certified that error appears in the above-identified patent and that said Letters Patent are hereby corrected as shown below:

In the heading, following Item [72] insert the following:

--[73] Assignee: Nissan Motor Company, Limited,
            Yokohama City, Japan
            a corporation of Japan--

Signed and sealed this 17th day of April 1973.

(SEAL)
Attest:

EDWARD M. FLETCHER, JR.          ROBERT GOTTSCHALK
Attesting Officer                Commissioner of Patents